Dec. 2, 1952    R. W. SLAUGH ET AL    2,620,130
POISE ERROR INDICATOR
Filed Feb. 9, 1951

INVENTOR
RICHARD W. SLAUGH
ARTHUR B. SINKLER

BY *M. W. Gould*
ATTORNEY

Patented Dec. 2, 1952

2,620,130

UNITED STATES PATENT OFFICE 2,620,130

POISE ERROR INDICATOR

Richard W. Slaugh and Arthur Brock Sinkler, Lancaster Township, Lancaster County, Pa., assignors to Hamilton Watch Company, Lancaster, Pa.

Application February 9, 1951, Serial No. 210,209

3 Claims. (Cl. 235—61)

This invention relates to an apparatus for dynamically poising a balance wheel of a watch.

The object of the present invention is to provide an apparatus which from a given set of factors will determine a resultant factor both as to weight and direction.

A further object of the present invention is to provide a set of adjustable springs connected to a center at one end and spaced 120° apart at the other end, whereby variation in the settings of the spaced ends will result in a location of the center which is a resultant of the tension on the springs.

A further object of the present invention is to provide a simple tool by means of which anyone may with three readings on a watch rate recorder made at different vertical positions determine the dynamic poise error of the balance wheel and the amount of weight necessary to correct that poise error, as well as the position at which to place the weight on the rim of the balance wheel.

The invention is illustrated in the accompanying drawing in which.

Figure 1:
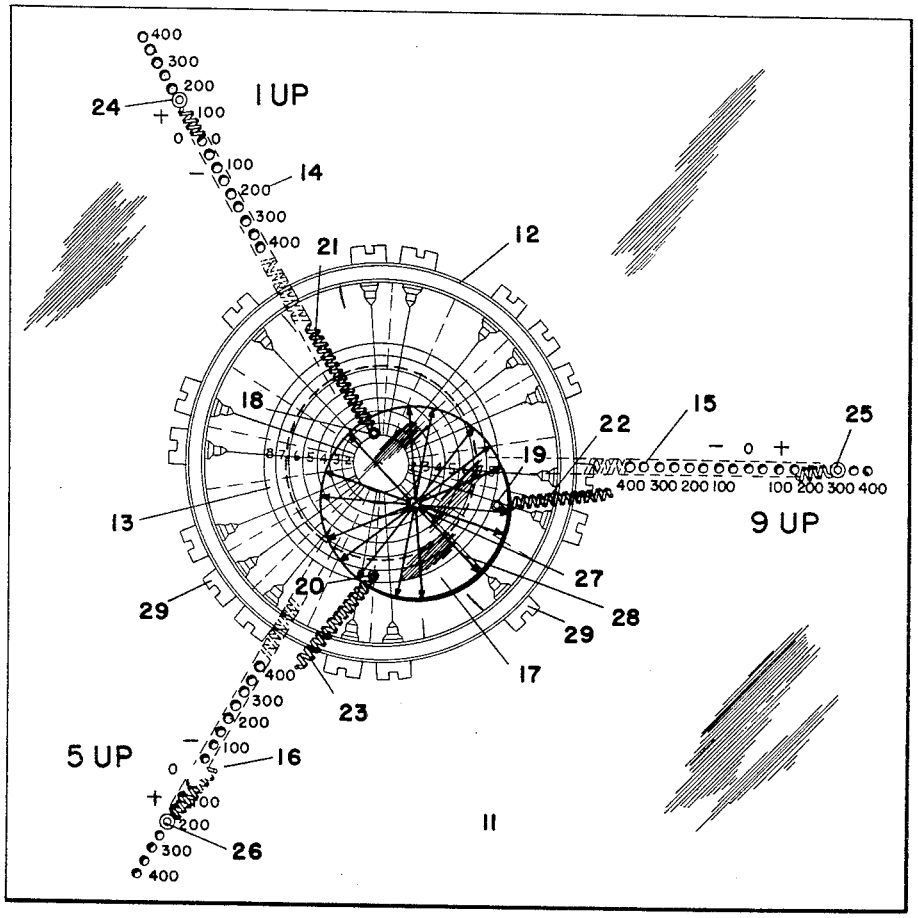
Figure 1 is a top plan view of the apparatus.
Figure 2:
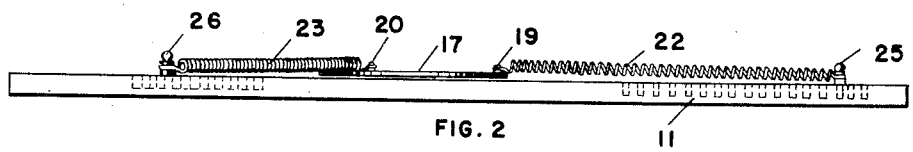
Figure 2 is a side elevation.
Figure 3:
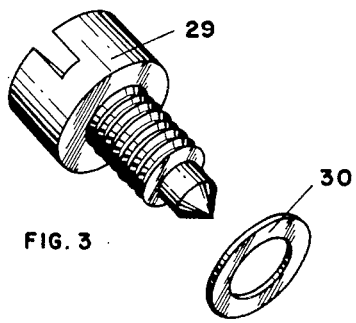
Figure 3 is a greatly enlarged view of a balance wheel screw with washer.

Referring particularly to Figure 1, a base 11 has pictured or drawn thereon a balance wheel 12 and a series of circles 13 concentric with said balance wheel and marked with graduations from 2 to 8.

Spaced 120° apart are a series of holes 14, 15 and 16 respectively which, if continued in a straight line, would intersect at a point coincident with the center of the balance wheel. These holes are graduated from a zero position which is on a circle concentric with circles 13, both plus and minus to correspond to rate recordings taken from a watch recorder. The series of holes indicate three vertical positions in which the watch is timed on the watch recorder and are here indicated arbitrarily as 1 up, 5 up and 9 up and, of course, may be any three positions which are 120° apart.

A circular disc 17 carries three pins 18, 19 and 20 respectively whose centers are located on a circle concentric with said disc and 120° apart. Attached to the pins are three equally calibrated springs 21, 22 and 23 respectively. These springs at their free end are pivotally connected to pins 24, 25 and 26 respectively. Pin 24 is used with graduated scale 14, pin 25 with graduated scale 15 and pin 26 with graduated scale 16. The disc 17 has a center opening 27 through which the underlying concentric circle 13 may be noted.

In use the rate of a watch is taken with the balance wheel making repeating oscillations of any definite degree and these readings which, on this particular illustration, is shown with the watch vertical, at the 1 up position as being 150 seconds fast, at the 5 up position as being 200 seconds fast and at the 9 up position as being 300 seconds fast, in twenty-four hours. The pins 24, 25 and 26 are then placed in the holes in accordance with these readings, pin 24 being placed in the hole indicating 150 seconds plus, pin 26 being placed in the hole 200 seconds plus and pin 25 being placed in the hole 300 seconds plus. This results in the center disc being moved to the position as shown in the drawing with the center opening 27 overlying one of the concentric circles 13. The arrows 28 drawn to indicate the positions of the screws 29 on the rim of the balance wheel are used as an indication of the direction of the resultant force on the central disc. This force is, of course, in a direct line with the center opening 27 and the center of the balance wheel, and the arrow which is parallel to that line between centers indicates the balance wheel screw which must be increased in weight. The reading on one of the concentric circles, in this case 3, indicates the weight (in hundredths of a milligram) which must be added to the indicated screw 29 in order to dynamically poise the balance wheel and to bring the watch to time.

A washer 30 may be added to the balance wheel screw 29 as a convenient way of adding weight, as it would only be necessary to maintain a stock of washers graduated in weight from $1/100$ milligram to $9/100$ milligram in order to have a complete range of additional weights. The mechanism forms a practical and simple way of dynamically poising a balance wheel and correcting a timekeeping error with the addition of a single weight to the rim of the balance wheel.

What is claimed is:

1. A resultant indicator comprising a base having a chart thereon, a series of concentric holes arranged in three radial rows 120° apart, a disc, springs secured to the periphery of said disc at one end, pegs fastened to the other end of said springs and adjustably positioned in said concentric holes to suspend said disc above said chart, and indicating means on said disc for reading said chart.

2. A resultant indicator comprising a base having a chart thereon, said chart consisting in a series of evenly spaced concentric circles and a drawing of a balance wheel also concentric with said circles, a series of holes concentrically arranged in three radial rows 120° apart, pegs adapted to be positioned in any of these holes in accordance with the number of seconds indicated as gain or loss in the test of a watch in three different vertical positions 120° apart, coil springs attached to each of said pegs, and a disc attached at three points of its periphery to the ends of said coil springs, the position of said disc serving as an indicator for reading said chart.

3. A resultant indicator to determine the location and magnitude of the dynamic poise error in a watch balance wheel, comprising a base, a chart of a balance wheel circumscribed about concentric circles on said base, a series of holes concentrically arranged in three radial lines 120° apart in said base, a disc, three equally calibrated springs attached at one end respectively to three peripheral points of said disc, said points being 120° apart, pegs attached to the free ends of each of said springs, said pegs being adapted to be received in certain of said concentric holes, the hole receiving said peg being determined by the rate error of said watch when tested in three different vertical positions, to impose different tensions on said springs with a resultant displacement of said disc above said chart, said disc being formed with a central hole and diametric arrows to indicate through said hole and by said arrow the magnitude and direction of the dynamic poise error.

RICHARD W. SLAUGH.
ARTHUR BROCK SINKLER.

REFERENCES CITED

The following references are of record in the file of this patent:

UNITED STATES PATENTS

| Number | Name | Date |
|---|---|---|
| 2,424,877 | Crawford | July 29, 1947 |
| 2,551,440 | Kreitner | May 1, 1951 |